United States Patent
Ewanus

[11] 3,864,635
[45] Feb. 4, 1975

[54] CORRELATION RECEIVER WITH RAPID FREQUENCY, TIME AND PHASE ACQUISITION

[75] Inventor: Walter Ewanus, Ellicott City, Md.

[73] Assignee: Westinghouse Electric Corporation, Pittsburgh, Pa.

[22] Filed: Aug. 4, 1972

[21] Appl. No.: 277,938

[52] U.S. Cl. ............... 325/421, 325/65, 328/155
[51] Int. Cl. .................................... H04b 15/00
[58] Field of Search.... 325/345, 346, 416, 418–420, 325/349, 432, 433, 421, 58

[56] References Cited
UNITED STATES PATENTS

| | | | |
|---|---|---|---|
| 3,290,603 | 12/1966 | Rabow | 325/421 |
| 3,614,627 | 10/1971 | Runyon et al. | 325/345 |
| 3,626,301 | 12/1971 | Develet, Jr. | 325/433 X |
| 3,649,919 | 3/1972 | Fridman et al. | 325/418 X |
| 3,657,661 | 4/1972 | Jarger | 325/419 X |
| 3,713,025 | 1/1973 | McNair | 325/58 |

Primary Examiner—Howard W. Britton
Assistant Examiner—Aristotelis M. Psitos
Attorney, Agent, or Firm—J. B. Hinson

[57] ABSTRACT

A correlation receiver provides rapid time, frequency, and phase acquisition in accordance with an optimum search procedure utilizing both parallel and sequential search techniques. Time and frequency acquisition are performed simultaneously, providing both correlation of a replica code at the receiver with the pseudorandom sequence code modulation of the carrier for time acquisition and acquisition of the frequency within the predetermined bandwidth of a filter of a filter bank affording a parallel frequency search. A search lock loop provides phase acquisition and simultaneously controls a frequency tracking loop to acquire the precise frequency. Maintenance of code, and thus time, tracking and indication of correlation are achieved by introducing error signals in corresponding control loops, the former serving to drive the system to precise acquisition in all domains. A coherent output, as well as AM and FM outputs, are readily provided.

18 Claims, 2 Drawing Figures

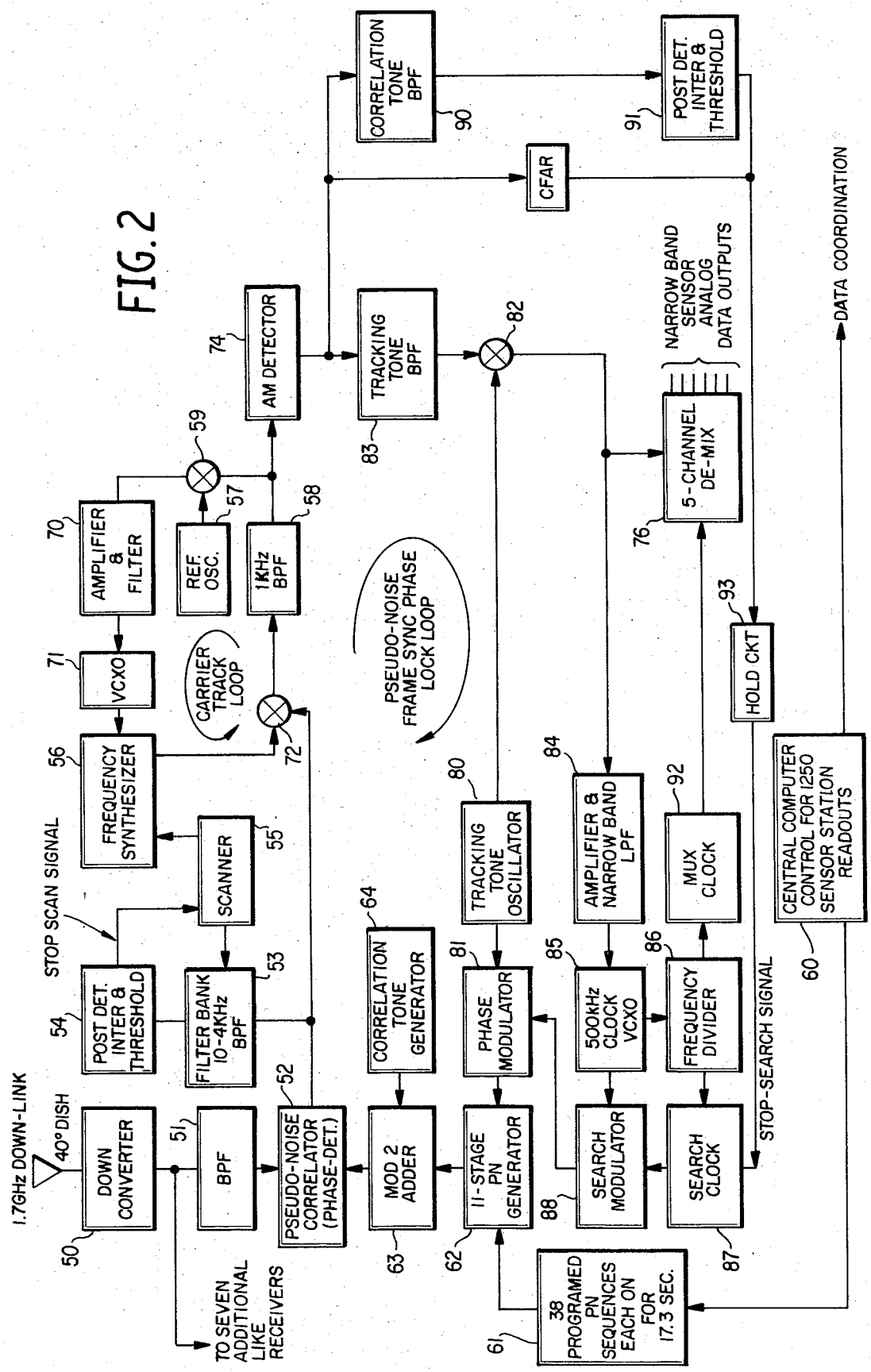

CORRELATION RECEIVER WITH RAPID FREQUENCY, TIME AND PHASE ACQUISITION

BACKGROUND OF THE INVENTION

1. Field of the Invention

This invention is concerned with receivers which resolve received signal uncertainties in each of time, frequency and phase domains and, in particular, to an optimum design for such receivers for minimizing the total time for signal acquisition in all domains and specifically including correlation receivers.

2. State of the Prior Art

Prior art correlation receivers characteristically search time, frequency and phase domains in sequence, so that each probable time period, or time slot, is examined for all possible frequencies and, in turn, each frequency in each time period is examined for phase coherence. For pseudo-random noise codes having sequences which repeat in time on the order of even only a few seconds, a sequential search procedure results in a prohibitively long acquisition time. Many code sequences are on the order of hours or even longer, however, with concomitant increase in the already prohibitively long acquisition time. The deficiencies of the prior art sequential search approach are further aggravated in the case of wide bandwidth systems for processing high data rate signals, and particularly where the signals may be composed of many independent sources of intelligence, multiplexed in time and frequency.

The need for searching in the time domain arises from the nature of pseudo-random sequence (PRS) modulation of a carrier, which results in producing a broad RF spectrum of extremely low spectral density. Sampling of the received RF spectrum at a fraction of its total bandwidth yields unintelligible information which, for the most part, appears as noise of a level perhaps even below the amplitude of ambient or receiver thermal noise levels. Furthermore, unless the receiver can produce a replica of the transmitted PRS code, demodulation is hopeless, and a time search will not reveal the necessary correlation conditions. It is fundamental then that the receiver capture the wide bandwidth of transmitter RF and that a correct replica PRS code be employed in the time search.

When proper signal correlation has been achieved, the received signal is compressed to its original narrow bandwidth and a significant signal amplitude is available for further processing. In most cases, the reconstructed transmitted signal still will lie within a bandwidth of frequencies as determined by intentional frequency multiplexing or by physical phenomena such as Doppler shifting. Hence, a frequency uncertainty exists as to the desired signal to be received. Thus, a moderately wide band receiver is employed to accommodate the frequency uncertainty of the signal to be received and, in the present example, the correlated signal. Increasing the bandwidth of the receiver, however, results in decreasing its signal to noise ratio for the desired signal, as received, and indeed the signal to noise ratio may be unacceptably low. In the case of a correlation receiver, therefore, coherent detection may become highly improbable.

Accordingly, it is necessary that the receiver acquire the signal within a bandwidth on the order of the intelligence modulation so that conventional demodulation may be employed for extracting the information modulation, which may be any of the various forms of amplitude, frequency and phase modulation.

Prior art approaches perform a frequency search in each of the possible bands of frequencies in which the received signal, after correlation, is expected to appear. The time for frequency search adds directly to the time already spent in achieving time acquistion, or PRS demodulation. Furthermore, another step is required to resolve the phase of the intelligence information, when applicable (e.g., where a coherent output is to be derived), again increasing the total acquisition time.

The deficiencies of the prior art sequential signal processing in the time, frequency and phase domains is overcome by the invention disclosed herein. The invention accomplishes frequency acquisition concurrently with time acquisition, effectively eliminating frequency search time. For signals bearing phase modulation intelligence, the total time for signal acquisition is only correlation time plus a relatively short period of time, related to the narrow bandwidth of intelligence modulation, for phase acquisition.

SUMMARY OF THE INVENTION

The correlation receiver of the invention affords an optimum search procedure utilizing both parallel and sequential search techniques to achieve time, frequency, and phase acquisition in a minimum time. In performing the time search, for achieving correlation with the pseudo-random sequence (PRS) modulation of the received signal, a replica of the known PRS code of the received signal is generated at the receiver, and is advanced or retarded relative to the received signal, and thus to the PRS code modulation thereof, until correlation. Proper correlation readily is determined when the transmitted signal is reconstructed into its narrow and components within the correlation receiver and thereby may be identified. Briefly, this process involves mixing the received signal of wide bandwidth and low spectral density with the replica of the PRS code of the transmitter in a correlation element. A variable frequency clock is controlled in a search loop to advance or retard the replica code over all possible bit positions, either continuously or discretely in fractional bit intervals. The rate of time correlation search is usually determined by the predetection bandwidth of the receiver, and the total time for search is directly related to the number of bits in the sequence for linear maximum-length-sequences.

As known from the prior art, even when time correlation is achieved, the narrow band reconstruction of the transmitted signal has a frequency uncertainty related to the bandwidth of all possible multiplexed frequencies transmitted, tolerances in oscillators at both the transmitter and receiver and uncertainties due to Doppler frequency shifting. A frequency search therefore must be performed.

In accordance with the invention, the frequency search is conducted simultaneously with the time search, through use of a filter bank which immediately determines the reconstructed received frequency within the predetection bandwidth of the receiver. Specifically, the filter bank is composed of a number of discrete filters, as determined by the total frequency uncertainty over the receiver predetection bandwidth. A frequency select logic circuit associated with the bank of discrete filters indicates within which particular filter a reconstructed signal has occurred. When an output is produced by the logic circuit, therefore, both time acquisition and frequency acquisition, the latter within a frequency uncertainty defined by the bandwidth of the filter within which the signal was identified, have been achieved.

The logic circuit also controls a frequency synthesizer element which, in turn, generates an output frequency, from a store of various frequency values corresponding to the frequency of the identified filter.

Phase and precise frequency acquisition are achieved simultaneously in related phase lock and frequency track loops. Specifically, the synthesizer frequency is mixed with the output frequency of a voltage controlled oscillator in the frequency track loop. The resultant signal is mixed with the incoming, correlated signal to produce a further IF signal supplied to the phase lock loop. The further IF signal, through a discriminator and filter, may provide directly an FM output.

The further IF signal moreover is supplied to a phase detector receiving also the output of a stable oscillator at the nominal frequency of the further IF signal for supplying, through a filter, the coherent output. The further IF signal and the oscillator output also may be mixed directly to provide, through a filter, an AM output.

The phase detector output also is supplied to a frequency track loop filter acting essentially as an integration, the output of which controls the above-noted voltage controlled oscillator (the output of which is mixed with the synthesizer frequency) thereby to achieve, simultaneously with the phase acquisition, precise frequency acquisition.

To facilitate the acquisition and maintenance of the received signal in time correlation, the receiver introduces a controlled amount of frequency and amplitude modulation of the replica code prior to mixing with the incoming signal. These modulations fall outside the bandwidth of intelligence modulation and do not interfere with subsequent demodulation of intelligence information from the reconstructed carrier, upon attaining correlation. Specifically, the controlled frequency modulation provides an error signal to the correlation track loop such that proper time phasing of the replica code can be maintained, and the controlled amount of amplitude modulation provides a positive indication to a display element that correlation has been achieved and is maintained.

The above and other objects and features of the invention will be better understood from the following detailed description of the invention taken in connection with the accompanying drawings. In the latter, two exemplary embodiments of a correlation receiver employing the features of the invention are set forth, the first comprising a telecommunication system providing demodulation of a number of high speed data links, and the second comprising a satellite communication system providing for the demultiplexing and demodulation of signals received from a great number of meterologic sensor stations transmitting periodically from random locations on the earth.

BRIEF DESCRIPTION OF THE DRAWINGS

FIG. 2 is a block diagram of a meterological satellite ground receiver complex incorporating the correlation receiver constructed in accordance with the invention.

DETAILED DESCRIPTION OF THE INVENTION

Figure 1:
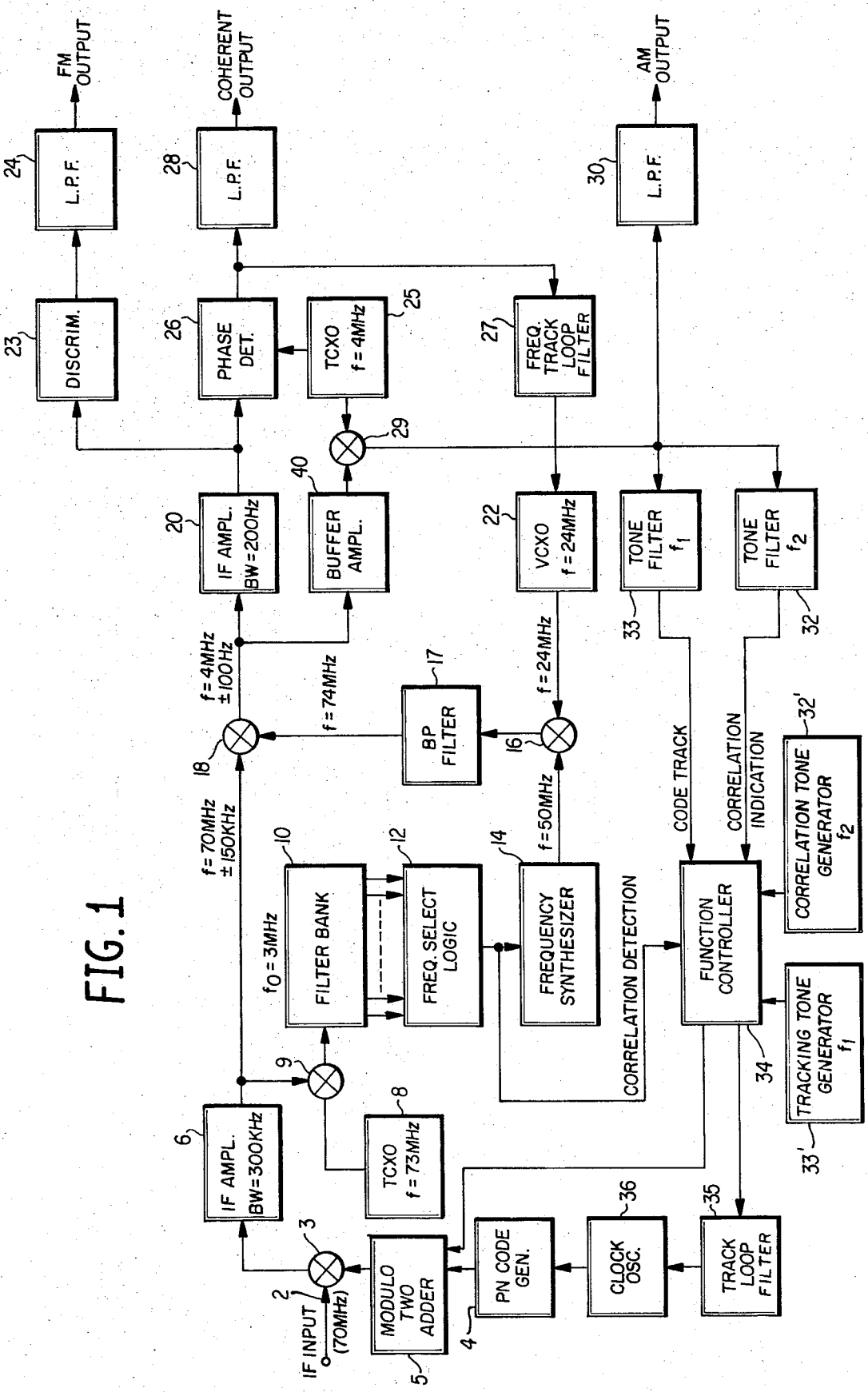
FIG. 1 is a block diagram of a correlation receiver utilizing the high speed acquisition techniques of the invention, and particularly as applied to a high speed telecommunication system.

The correlation receiver of the invention is described first in terms of its three distinct control functions and secondly in an illustrative mechanization of these functions, including a multiplicity of control loops which are operated in harmony to accomplish acquisition of the desired signal. The input signal to the receiver has uncertainty characteristics related to time, frequency and phase domains. In accordance with the invention, an optimum search process is performed in all three domains, utilizing the most advantageous aspects of each of sequential and parallel search techniques in conjunction with a novel phase lock loop acquisition requiring no additional frequency search, and thereby minimizing the time required for signal acquisition.

In a search process for a pseudo-random sequency (PRS) modulated carrier, it is conventional to search sequentially each possible bit position to find time synchronization, which also uniquely defines autocorrelation. As an example, one class of digital sequences employs a number of bits in a pseudo-random sequence (PRS) defined by $N = 2^n - 1$ where $n$ equals the number of stages of a shift register for a linear-maximum-length-sequence. The maximum search time to achieve synchronization is then the product of the search rate, defined as a frequency $fs$, and the total number of bits (N) corresponding to the linear-maximum-length-sequence. The permissible search rate, $fs$, for a sequential time search is related to, and thus defined by, the receiver bandwidth according to:

$$fs = Bi/K \tag{1}$$

where
$Bi$ = receiver bandwidth in Hz and
$K$ = a factor commonly set equal to 1.0

The maximum code search time, $Ts$, then is the reciprocal of the search rate, $fs$, times the total number of bits and thus, in view of equation (1):

$$Ts = N/Bi, \text{ seconds} \tag{2}$$

In the receiver, the search process for a PRS modulated carrier includes generating a replica of the transmitter PRS, and effecting a time scan of the received PRS modulated carrier to achieve correlation between the received signal and the replica PRS. In practice, the receiver replica sequence is time scanned over all possible bit positions at a given search rate, either continuously or discretely in fractional bit intervals. Synchronization is achieved when the replica PRS is correctly in time and phase with the received PRS. Only under this condition can further processing of the received signal take place.

Frequency uncertainty is related to the band of frequencies, $Bf$, within which a transmitted signal may appear, and to the bandwidth of the receiver, $Bi$. The number of frequency slots which must be searched for the desired signal then is determined by the ratio of $Bf/Bi$. The maximum rate at which a receiver can scan the frequency slots is approximately the reciprocal of the receiver bandwidth $Bi$, so that the time, $Tf$, required to perform the frequency search in the total band $Bf$ is approximately:

$$Tf = (Bf/Bi) \times (1/Bi), \text{ seconds} \quad (3)$$

For forms of signal modulation employing phase modulation, an additional time $Tp$ is required for phase acquisition. In general, the search for phase coincidence will take place after the frequency search has resulted in acquiring the signal, so that the frequency certainty is limited to $\pm Bi/2$, the bandwidth of the receiver. Through proper choice of phase lock loop parameters, time for phase acquisition can be equated to the reciprocal of bandwidth:

$$Tp = 1/Bi, \text{ seconds} \quad (4)$$

The total time $Ta$ for sequential correlation search in the receiver to accomplish time, frequency and phase acquisition of one received signal is approximated by:

$$Ta = Ts + Tf + Tp \text{ or,}$$
$$Ta = N/Bi + Bf/(Bi)^2 + 1/Bi, \text{ seconds} \quad (5)$$

It is noted that the factor $Tp$ is not included in forms of signal modulation characterized by frequency modulation (FM) or amplitude modulation (AM), but is required for phase modulated (PM) signals.

In accordance with the invention, the time $Ta$ is minimized by performing parallel search for time and frequency uncertainties. The prior art teaches several methods of performing time searches for PRS acquisition and particularly to accelerate time searches, as a separate objective; these, therefore, are not elaborated upon here. Rather, time search techniques are considered herein only in combination with frequency and phase searching, with the objective of minimizing the total acquisition time, $Ta$. For completeness in the discussion, however, elements related to the time search are included. The invention thus is also significant as to signal acquisition where only the terms $Tf$ and $Tp$ are considered, and thus where correlation reception is not utilized.

The requirement to search a band of frequencies, $Bf$, with a receiver having a bandwidth, $Bi$, establishes a number, $Nf$, of frequency slots within the range of $Bf$ as determined approximately by the ratio:

$$Nf = Bf/Bi \quad (6)$$

From equation (3), it is recalled that the time for frequency search $Tf$ is equal to $Bf/(Bi)2$; thus performing a parallel and simultaneous search of each frequency slot $Nf$ reduces the time $Tf$ for frequency acquisition by a factor of $1/Nf$ or, where $T'f$ is the time for the simultaneous parallel search, $$T'f = [Bf/(Bi)2] \times (1/Nf)$$

which, by substitution from equation (6), reduces to:

$$T'f = 1/Bi, \text{ seconds} \quad (7)$$

From the foregoing, the frequency uncertainty within any one frequency slot is now no greater than the narrowest bandwidth of the receiver, $Bi$, and thus is equivalent to an uncertainty of $\pm Bi/2$, where $Bi$ is the bandwidth of a simple filter, or resolution element, of the filter bank.

The definition of $Nf$ frequency slots may be implemented by a bank of $Nf$ filters selected to have their respective frequency bandpasses centered about $Bi/2$ increments, successively displaced in center frequencies from the low frequency end of $Bf$ to the high frequency end of $Bf$, in $Nf$ contiguous steps. Detection of a signal in one of the $Nf$ filters is used to preset a phase-lock loop and initiate signal acquisition for subsequent signal intelligence demodulation.

The total signal acquisition time for a sequential correlation search, utilizing a parallel search of frequency, is expressed therefore as:

$$T'a = Ts + T'f + Tp,$$

or $$T'a = N/Bi + 1/Bi + 1/Bi,$$

and thus $$T'a = N + 2/Bi \text{ (seconds)} \quad (8)$$

In accordance with the invention, a further reduction in time for search is achieved by performing the frequency search simultaneously with the time search, so that the total time for search is just the sum of the time search, $Ts$, and the phase search, $Tp$, yielding the relationship:

$$T''a = N/Bi + 1/Bi,$$
$$T''a = N + 1/Bi \text{ (seconds)} \quad (9)$$

A mechanization of hardward elements to implement the features expressed by equation (9) is discussed in the following.

In FIG. 1, is shown a block diagram of a correlation receiver which affords a specific illustration of a mechanization for accomplishing search and acquisition in the three domains of time, frequency and phase, in accordance with the foregoing techniques. The frequencies indicated in the specific embodiment here disclosed are representative of those employed in a receiver having utility in high speed digital data signal processing systems. The signal input is shown to be an IF interface, and any RF input could be implemented in the manner shown. Likewise, the frequencies and bandwidths as shown are typical for such a system but are only illustrative and not limiting. In addition, AM and FM outputs are shown for illustrating an implementation of those modes of operation.

An incoming signal on line 2 is multiplied in a phase correlator 3 by a replica code sequence generated by PN code generator 4. The input signal comprises intelligence modulation in one or more forms of amplitude, frequency and phase modulation, as well as pseudo-random noise modulation. As is known, pseudo-random noise modulated signals are characterized by a wide frequency spectrum and low spectral density. If time synchronization exists between the received pseudo-noise code sequence and the correlation receiver replica code, a narrow-band signal is constructed in the phase correlator 3 and is produced as an output signal of sufficient amplitude and signal-to-noise ratio for subsequent processing. As shown, the input signal 2 may have a center frequency at 70 MHz and, upon correlation, the output, narrow-band signal likewise of 70 MHz center frequency is made input to IF amplifier 6, the latter having a bandwidth of 300 KHz, by example. Referring to equation (3), above the uncertainty bandwidth Bf of the received signal can be example correspond to 300 KHz.

To permit a convenient frequency band for driving the filter bank 10, an intermediate frequency of 3 MHz, for example, is produced by the heterodyning action of local oscillator 8, which may be crystal controlled, and mixer 9. The filter bank 10 comprises a number of bandpass filters spanning the frequency range of 300 KHz with a center frequency $fo = 3$ MHz. Assume that each filter in the filter bank 10 has a bandwidth of 200 Hz. From equation (6) above, the number of discrete filters in filter bank 10 is determined by the ratio of the frequency uncertainty bandwidth, $Bf$, and the receiver (filter) bandwidth, $Bi$, resulting in:

$$Nf = Bf/Bi = 300 \text{ KHz}/200 \text{ Hz} = 1{,}500$$

Thus, the filter bank 10 comprises 1,500 filters, each of 200 Hz bandwidth in discrete contiguous steps and thus encompassing a total signal bandwidth uncertainty of 300 KHz.

When a given one of the bank of filters 10 detects the presence of a signal within its bandpass, a unique logical representation, or identification, of the signal frequency is produced by the frequency select logic 12, which may be conventional, and is supplied to the frequency synthesizer 14. The synthesizer then generates an output signal of an appropriate frequency, shown nominally as 50 MHz, in accordance with further mixing functions to be described, and which is derived from a store of available synthesized output frequencies respectively related to the frequencies identified by logic 12 from filter bank 10. The output frequency from synthesizer 14 is supplied to a mixer 16, which also receives an output frequency from voltage controlled oscillator 22. The sum of these two frequencies is filtered by bandpass filter 17 and supplied to mixer 18. Illustrating this process with specific frequencies, a synthesizer output at 50 MHz is summed with a signal frequency of 24 MHz from voltage controlled oscillator 22 to yield at mixer 18 an input frequency of 74 MHZ. Recalling that the intelligence bearing signal from IF amplifier 6 is centered about 70 MHz, the mixing action of mixer 18 produces a difference frequency of 4 MHz which is made input to IF amplifier 20 and buffer amplifier 40, to be discussed subsequently. At this juncture, the received signal has been determined to an uncertainty no greater than the bandwidth of the IF amplifier 20 or, more generally, to $\pm(Bi/2)$ For frequency modulated (FM) intelligence, the output of IF amplifier 20 may be processed directly in a conventional discriminator 23 and low pass filter 24 to yield an FM output. In addition a conventional automatic frequency control (AFC) could be provided to center the received signal in the IF amplifier 20 for optimum detection of the FM signal in discriminator 23.

To resolve the phase uncertainty of the received signal, there is further provided a control loop which produces error feedback to the elements previously discussed. To provide a frequency reference, crystal controlled oscillator 25 is fixed at the center frequency of IF amplifier 20, which, for the example given, is 4 MHz. Phase detector 26, receiving the nominally 4 MHz signal from IF amplifier 20 and the 4 MHz signal from crystal oscillator 25, then measures the phase difference between these two input signals and supplies an output to track loop filter 27 filter 27 acts as an integrator in response to the output from detector 26, the output of filter 27 then controlling the output frequency of VCXO 22, as discussed below. Once the phase tracking loop is established, the output of the phase detector 26, when filtered through filter 28, is, in fact, the intelligence resulting from phase modulation in the received signal, and thus, affords the coherent output signal of the receiver.

To complete the phase tracking loop, the output of track loop filter 27 is made input to the voltage controlled oscillator 22. Track loop filter 27 produces an output voltage corresponding to any detected deviation in phase of the output signal from amplifier 20, relative to a reference, in this case the 4 MHz output of oscillator 25 as detected by phase detector 26, and, which causes oscillator 22 to increase or decrease its output frequency, as required, to reduce error in the control loop to zero value and maintain the received signal in the center of the IF amplifier 20 for optimum detection.

Amplitude modulation occurring as intelligence in the received signal is detected by mixing the output of crystal controlled oscillator 25 and the output of buffer amplifier 40 in mixer 29. The output of mixer 29, when filtered in low pass filter 30, yields the AM output directly, at the signal base band.

To reiterate, the output of the frequency select logic 12 signified both the capture of the received signal in the time domain, and also, through the initiating action of the frequency synthesizer 14, occurring simultaneously, capture in the frequency domain, within the noted uncertainty. Most significant to note is that the frequency acquisition of the received signal, at least within the uncertainty of the bandwidth of the responding filter in filter bank 10, occurred simultaneously with the time acquisition of the signal, as proposed in relation to equation (9). Tracking in the phase domain and, as well, resolving of the limited uncertainty of the frequency tracking, is performed essentially simultaneously in the control loop comprising elements 16, 17, 18, 20, 25, 26, 27 and 22. State of the art techniques permit this loop to function within the time established by the bandwidth of the IF amplifier 20. As illustrated, amplifier 20 has a bandwidth of 200 Hz, and thus, from equation (4), $Tp = 5$ milliseconds.

The correlation receiver of FIG. 1 includes control loops for the time acquisition function, including tone generators 32' and 33', respectively corresponding, tone filters 32 and 33. The tone generator outputs and the filter outputs are supplied to function controller 34 which operates to control the time acquisition loop, the latter generally illustrated as comprising the PN code generator 4, an associated clock oscillator 36, and a track loop filter, 35. The control loop operation employing the outputs of filters 32 and 33 is to be understood as distinct in its function from the previously discussed frequency and phase acquisition control loops.

During the time search, track loop 35 causes the clock oscillator 36 to increase or decrease slightly its nominal clock rate so that the replica code of the PN code generator 4 is advanced or retarded in time relative to the PN code modulation of the received signal. It should be noted and obvious to anyone skilled in the art that this can also be accomplished digitally by incrementing the clock output plus and minus fractional bits to cause the PN code to be advanced and retarded as in the analog fashion described. When the replica code corresponds bit-for-bit with the code of the received signal, a narrow-band signal results at the output of IF amplifier 6, as discussed before, and frequency and phase lock commences. Specifically, the filter bank 10 produces an output signal through one of its filters to which the frequency select logic responds, for identification of that frequency to the synthesizer 14 as aforedescribed, and as well for recognizing that correlation has been achieved, thereupon to provide a correlation detection input to function controller 34. The time, or PN code, search immediately ceases, and the time tracking loop is essentially closed. To secure the PN code tracking loop and provide a positive indication of track, the outputs of tone filters 32 and 33 are employed as follows.

To develop an error signal suitable for maintenance of the PN code correlation tracking condition, a small amount of phase modulation is introduced into the replica code by the function controller 34 from tracking tone generator 33' to the track loop element 35 which, in turn, frequency modulates the clock oscillator 36 and thereby phase modulates the replica code. The net effect is to produce amplitude modulation side-bands of discrete frequencies in relation to the narrow-band frequencies of the received signal after correlation, which are passed by IF amplifier 6, are mixed at 18 and 29 and are filtered by tone filter 33 at the specific frequency $f_1$. The resulting track loop function is generally of conventional type in that, when a null of signal energy at the frequency $f_1$ occurs, precise correlation has been achieved, whereas for less than precise correlation, the $f_1$ signal affords an indication of the necessary direction and amount of adjustment of the clocking rate and phase of the replica code to attain precise correlation.

To produce an indication that time acquisition has occurred, the function controller 34 also digitally adds (modulo-two) a specific amount of a known digital signal from correlation tone generator 32' at a frequency $f_2$, also out of the signal bandwidth, to the output of the PN code generator 4 at modulo-two adder 5 such that the correlated output of the detector then produces a voltage that is maximum when correlation is achieved. The net effect is to produce a set of side-bands in composition with the received signal. The side-band signals are passed by IF amplifier 6, mixers 18 and 29, and are filtered by tone filter 32 at frequency $f_2$. The resulting signal from tone filter 32, shown as a "correlation indication" in FIG. 1, is an amplitude modulated signal, and thus detection is readily accomplished, by a diode for example; a direct current component thereby is provided for driving a display device such as a lamp or other indicator.

It is noted that both signals, i.e., amplitude modulation components, developed above as part of the PN code tracking loop are designed to fall sufficiently outside the bands of frequencies in which intelligence modulation can occur, so that no interference is developed in the correlation receiver. Furthermore, the validity of the tracking signals is seen clearly with regard to the situation where time acquisition has not occurred and only broad-band noise is present in the IF amplifier 6. In this case, no carrier frequency is available in the receiver band-pass to generate the necessary side-bands of frequencies.

In FIG. 2 is shown a specific systems application of the invention, comprising a meteorological satellite system. Meteorological data originating from 10,000 sensor stations on earth is transmitted to a synchronous orbit satellite and relayed to ground stations at designated facilities. The transmissions from the multitude of sensor stations are composed of modulated RF using pseudo-random time frequency multiplexing. Novel features of the system include a transmit-only capability at each sensor station, with required stability of no better than one part in $10^5$, no need for station interrogation or coherent time synchronization, and a minimum of intermodulation or co-channel interference.

In the design of the system, each of the 10,000 sensor stations is capable of transmitting up to five channels of narrow-band data, typically 10 Hz. Transmitter power is limited to 10 watts per station, and only a 3db omnidirectional antenna may be used. The total available bandwidth for the 10,000 sensor stations is no greater than 8 MHz, the predetection information bandwidth per station is 1 KHz and all 10,000 sensor stations must report for at least 10 seconds once each 6 hours.

To satisfy the above requirements, the 10,000 stations are frequency multiplexed into eight groups of 1,250 each such that each group occupies a bandwidth of 1 MHz. Within each group, the 1,250 transmitters are time multiplexed so that only 38 transmissions are occurring at any given time within a group. The selection of any one transmission within a group is accomplished by correlating one of 38 pseudo-random noise replica codes with the received signal. Employing a 500 KHz clock at each sensor station for a 1 MHz spread spectrum, the system spread ratio for a predetection bandwidth of 1 KHz is then 30 db. An oscillator having stability of 1 part in $10^5$ and operating at 500 KHz will present a frequency uncertainty of only ± 5 Hz such that time acquisition of a given PN code sequence can be achieved in 4 seconds. As each of the groups is frequency multiplexed, only 38 unique PN codes are required for the system of 10,000 stations.

In FIG. 2 is shown one of eight similar receivers employed in such a system, each such receiver serving to derive the intelligence information transmitted by its related group of 1,250 stations, and at known time intervals, such that only 38 PN coded signals need be demodulated. An RF antenna and receiver system 50 converts a 1 MHz signal relayed by the satellite to an intermediate frequency (IF). The IF signal is bandpass filtered at 51 to select one of eight frequency bands. A central computer control element 60 selects in sequence one of 38 PN codes available from system 61, the selected sequence, in turn, controlling a PN code generator system comprising an 11 stage PN generator 62, a modulo 2 adder 63 and a correlation tone generator 64. The output of the modulo 2 adder is correlated with the received signal output from bandpass filter 51 in pseudo-noise correlator 52. As discussed previously, the correlator 52 collapses the received broad-band signal of low spectral density into a narrow-band signal of significant amplitude and signal-to-noise ratio, and may be characterized as a phase detector in this system.

As illustrated, the carrier frequency of each station is nominally 2.0 GHz. In keeping with the tolerance capability of one part in $10^5$, a frequency uncertainty of ± 20KHz is presented to the receiver of FIG. 2. The output of correlator 52 thus is the desired narrow-band signal with a center frequency uncertainty of ± 20 KHz, corresponding to the term Bf developed previously in connection with equation 3. In a fashion similar to the correlation receiver of FIG. 1, filter band 53 of FIG. 2 corresponding to element 10 of FIG. 1 is comprised of 10 discrete filters, in this example, however, of 4 KHz bandwidth each. The post detector interrogator and threshold circuit 54 and the scanner 55 perform the functions of the frequency select logic 12 of FIG. 1, to detect the output of the filter of bank 53 passing the signal, and provide logic control to frequency synthesizer 56 of FIG. 2, corresponding to synthesizer 14 of FIG. 1. To resolve the 4 KHz uncertainty remaining, the carrier track loop comprised of reference oscillator 57, 1 KHz bandpass filter 58, mixer 59, amplifier 70 and voltage controlled oscillator 71 and mixer 72 function to search for and establish lock on the 1 KHz bandwidth of intelligence signal.

The specific function of the carrier track loop is to control the output frequency of the frequency synthesizer 56 such that when that output is mixed in mixer 72 with the IF frequency output of the correlator 52, a base band signal of 1 KHz intelligence results. AM detector 74 demodulates the signal and presents the composite sensor data to a 5-channel demultiplexer 76. Recalling that each sensor station can multiplex up to five sensors having 10 Hz signal bandwidth each, the outputs of the demultiplexer 76 thus comprise the narrow band sensor analog data outputs of the sensor station currently processed in the receiver.

To facilitate the maintenance of the PN code tracking, a tone is generated in the receiver by tracking tone oscillator 80 which, through phase modulator 81, modulates the PN generator 62. Mixing of the tracking tone in mixer 82 with the output of tracking tone bandpass filter 83 develops an error signal supplied to the amplifier and the narrow band, low pass filter circuit 84. The output of circuit 84 controls the output frequency, nominally 500 KHz, of the voltage controlled clock oscillator 85, the output thereof, in conjunction with frequency divider 86, search clock circuit 87, search modulator 88 and phase modulator 81, serves to advance or retard the time rate of the replica PN code generated by generator 62. When PN code tracking is achieved, the correlation tone introduced in the PN code tracking loop is filtered in bandpass filter 90, processed in post detector 91 and made input to hold circuit 93. The hold circuit 93 generates a stop-search applied to the search clock 87, whereupon the PN code (time) search is halted and tracking is maintained.

Upon achieving time and frequency acquisition, the PN loop proceeds to perform phase acquisition. Particularly, an output of frequency divider 86 is supplied to a demultiplexing clock 92 which is driven thereby to provide the necessary coherent phase information for proper demultiplexing in the 5-channel demultiplexer 76. As in the case of the receiver of FIG. 1, the tone generated within the receiver of FIG. 2 for tracking purposes is designed to fall outside the bandwidth of intelligence modulation and does not interfere with the desired signal and sensor data.

Block 95, labelled CFAR, is a "Constant False Alarm Rate" threshold detector and may be conventional as to its structure and operation.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A receiver for resolving frequency and phase uncertainties of a received signal, comprising means for identifying the frequency of a received signal within one of a plurality of differing slots each of limited frequency uncertainty and the plurality of differing frequency slots encompassing the entire range of frequency uncertainty of a received signal, means for generating a synthesized frequency signal having a first nominal frequency means for generating an adjustable frequency oscillation signal having a second nominal frequency so related to the first nominal frequency of the synthesized frequency signal that the combination of the first and second nominal frequencies corresponds to a third nominal frequency differing from the frequency of the received signal by a desired IF value, said synthesized frequency generating means being responsive to said frequency identification means to generate said synthesized frequency signal at a frequency value, relative to said first nominal frequency, which corresponds to the frequency slot identification of said received signal.

means for mixing the adjustable frequency oscillation signal and the synthesized frequency signal to produce a combined signal having said third nominal frequency, means for mixing the combined signal with the received signal to convert the received signal to an IF signal having a nominal frequency of the desired IF value, means for producing a reference oscillation signal at the said desired IF value, phase detection means responsive to the IF signal and the reference oscillation signal to detect and produce an output representing any difference in phase therebetween and said adjustable frequency oscillation signal generating means is responsive to the output of said phase detection means to adjust the frequency of said adjustable frequency oscillation signal generated thereby, to achieve phase acquisition of the received signal 2. A receiver as recited in claim 1 wherein said means for generating a synthesized frequency signal comprises:

a frequency synthesizer having a store of predetermined, different frequency output signals corresponding to the differing frequency slots, logic means responsive to a frequency slot identification of a received signal by said frequency identifying means to identify the frequency of that slot, within the bandwidth of the slot, to said frequency synthesizer, and said frequency synthesizer responds to the output of said logic means to generate the respectively corresponding synthesized frequency signal 3. A receiver as recited in claim 1 wherein said frequency identifying means comprises:
a filter bank of plural filters of contiguous bandwidths respectively defining said differing frequency slots, the bandwidth of each filter establishing the frequency uncertainty of each frequency slot; and
means for supplying to said filter bank a received signal, an output from one of said filters of said bank thereby indicating receipt of a signal and its frequency within the frequency uncertainty of the bandwidth of the filter producing the output.

4. A receiver as recited in claim 3 wherein said supplying means of said frequency identifying means further comprises:
oscillation means producing a fixed frequency output, and
further mixing means for mixing the received signal and the fixed frequency output of said oscillation means to supply said received signal to said filter bank at a reduced, desired center frequency relative to the total bandwidth of said filter bank, said fixed frequency of said oscillation means being selected to differ by the amount of said center frequency from the nominal frequency of the received signal.

5. A receiver as recited in claim 3 wherein said means for generating a synthesized frequency signal comprises:
a frequency synthesizer having a store of predetermined frequency output signals corresponding to the center frequencies of said filters,
logic means responsive to an output from one of said filters of said filter bank to identify the frequency of that filter for supply to said frequency synthesizer, and
said frequency synthesizer responds to the output of said logic means to generate the respectively corresponding synthesized frequency signal.

6. A receiver as recited in claim 1 further including discriminator means receiving the IF signal for producing an FM output 7. A receiver as recited in claim 1 further comprising:
means for mixing the IF signal and the reference oscillation signal and producing an output representing the AM information content of the received signal, and
filter means receiving said output of said mixing means for producing an AM output signal.

8. A receiver as recited in claim 1 which further comprises:
filter means receiving the output of said detector means for producing a coherent output.

9. A receiver as recited in claim 8 further comprising:
means for mixing the IF signal and said reference oscillation signal to produce a further combined signal, and
means responsive to said further combined signal for producing an AM output.

10. A receiver as recited in claim 1 wherein said adjustable frequency reference oscillation signal generating means comprises:
a controlled frequency oscillator producing said second nominal frequency of oscillation, and a track loop filter responsive to the output of said phase detection detector means for controlling the output frequency of said controlled frequency oscillator to acquire and track the phase and thereby the frequency of the received signal.

11. A receiver as recited in claim 1 for resolving uncertainties in time of a received signal, produced by code modulation thereof in accordance with a known transmitter code and further comprising:
a code generator of an adjustable clocking rate for generating a replica of the transmitter code,
means for mixing the replica code of said code generator with the received signal, and
means for controlling the code generator to vary the clocking rate of the replica code produced thereby to attain correlation of the replica code with the code modulation of the received signal, said controlling means being responsive to a frequency identifying output from said frequency identifying means to terminate further variation of the clocking rate and to maintain the clocking rate of the code generator in synchronism with the code modulation of the received signal.

12. A receiver as recited in claim 11 wherein:
said controlling means modulates the clocking rate of the code generator at a first frequency to effect a phase modulation of the replica code and produce an amplitude modulation component of the received signal at a frequency corresponding to said first frequency, and there is further provided
means for mixing the IF signal with the reference oscillation signal to produce an output
a first filter tuned to said corresponding frequency of the resulting amplitude modulation and receiving said output of said means for mixing the IF signal and the reference oscillation signal, and producing an output in response to the modulation component thereof at said corresponding frequency, and
said controlling means responds to said output from said first filter to control the modulation of the code generator clocking rate for maintaining correlation with the code modulation of the received signal.

13. A receiver as recited in claim 11 wherein:
said controlling means supplies and adds a digital signal of a second frequency to the replica code output of said replica code generator to produce an amplitude modulation component of the received signal of a known, corresponding frequency, and there is further provided
means for mixing the IF signal with the reference oscillation signal to produce an output
a second filter tuned to said known, corresponding frequency of the resulting amplitude modulation, said second filter receiving said output of said means for mixing the IF signal and the reference oscillation signal, and producing an output in response to the resulting amplitude modulation component of said known, corresponding frequency to provide a correlation indication output.

14. A receiver as recited in claim 12 wherein:
said controlling means supplies and adds a digital signal of a second frequency to the replica code output of said replica code generator to produce an amplitude modulation component of the received signal of a known, corresponding frequency, and there is further provided.

a second filter tuned to said known, corresponding frequency of the resulting amplitude modulation, said second filter receiving said output of said means for mixng the IF signal and the reference oscillation signal, and producing an output in response to the resulting amplitude modulation component of said known, corresponding frequency of the received and acquired signal to provide a correlation indication output.

15. A receiver for acquiring a received signal having phase and frequency uncertainties, comprising:

a first loop for performing a parallel frequency search of the received signal for frequency acquisition thereof within one of a predetermined number of frequency slots of differing center frequencies and acceptable bandwidths of frequency uncertainties, the totality of said frequency slots encompassing the entire bandwidth of frequency uncertainty of the received signal, and said first loop receiving the received signal and identifying and thereby acquiring the frequency thereof as within one of said frequency slots, and producing a synthesized frequency output corresponding in frequency to the thus acquired frequency of the received signal, a second loop for performing phase acquisition of the received signal, including means for producing a controlled frequency oscillation output means for mixing said synthesized frequency output of said first loop and said controlled frequency oscillation ouput of said second loop and producing a first mixed output, means for mixing said first mixed output with the received signal to convert said received signal to an IF signal, means for generating a reference oscillation signal at the frequency of the IF signal, and means for detecting the phase of the IF signal relative to said reference oscillation signal and producing an output corresponding to any detected phase difference therebetween, and said means for producing the controlled frequency oscillation is responsive to said output of said detection means to adjust the phase of the controlled frequency oscillation thereby to acquire the phase of the received signal.

16. A receiver as recited in claim 15 for acquiring a received signal having time uncertainty resulting from code modulation thereof in accordance with a known transmitter code, further comprising a time acquisition loop for achieving time acquisition simultaneously with said frequency acquisition of said first loop, including:

means for generating a replica code, means for mixing the replica code with said received signal, prior to supply of the received signal to said first and second loops, and means for altering the timing of said replica code to achieve correlation with the code modulation of the received signal, said altering means being responsive to the attainment of frequency acquisition by said first loop to terminate further altering of the replica code timing thereby to maintain correlation of the replica code with the code modulation of the received signal.

17. A receiver as recited in claim 16, further comprising a code tracking loop including:

means for modulating the clocking rate of the replica code at a given frequency to effect a phase modulation of the replica code and produce an amplitude modulation component of the received signal in said time acquisition loop at a known, corresponding frequency displaced from the bandwidth of the information content of the received signal, means for deriving an amplitude modulation output from said second loop, and means receiving said amplitude modulation output of said second loop and responsive to the modulation component at said known, corresponding frequency for controlling said altering means to maintain said replica code in correlation with the code modulation of the received signal.

18. A receiver as recited in claim 16 further comprising a code tracking loop including:

means for adding to the replica code, a digital signal of a known frequency to produce an amplitude modulation component of the received signal, of a corresponding frequency displaced from the bandwidth of information content of the received signal, in said time acquisition loop, means for deriving an amplitude modulation output from said second loop, and means receiving said amplitude modulation output of said second loop and responsive to the amplitude modulation component at said known, corresponding frequency to provide a correlation indication.

* * * * *